United States Patent Office 2,964,387
Patented Dec. 13, 1960

2,964,387

METHOD OF PREPARING GROUP VI-B METAL HEXACARBONYLS

Harold E. Podall and Hymin Shapiro, Baton Rouge, La., assignors to Ethyl Corporation, New York, N.Y., a corporation of Delaware No Drawing. Filed Dec. 29, 1958, Ser. No. 783,070

1 Claim. (Cl. 23—203)

This invention relates to manufacture of metal carbonyls particularly the manufacture of the group VI-B metal carbonyls.

Some procedures for the preparation of certain metal carbonyls have been described in the literature. With particular metals, successful results are obtained by reacting the metal with carbon monoxide at high temperatures and pressures or in certain instances reacting particular metal salts with hydrogen and then carbon monoxide. These procedures are applicable only in limited instances as, for example, with the metals nickel and iron. They likewise leave much to be desired since stringent process techniques are required and the metal or metal compound must be in particular form.

The procedures likewise are not available to the more difficultly produced metal carbonyls, particularly group VI-B metal carbonyls. The most satisfactory procedure devised as yet for the preparation of certain more difficultly produced metal carbonyls involves the reaction of their salts with a Grignard reagent and then reacting the product so-produced with carbon monoxide. This two-step procedure has been improved by judicious choice of the Grignard reagent employed. However, even with these improvements the process suffers particular disadvantages which are to be overcome. For example, for some unexplained reason the process is relatively independent of variables such as pressure beyond a certain point. In other words, essentially no change is obtained in the rate of reaction or the yield when these variables are changed. Another inherent disadvantage in the process is that the yields are such that commercial employment of the procedure is not practical. A still further disadvantage of this process is that, during the course of reaction, by-product metal, that is the metal desired to form the metal carbonyl compound is obtained and this material cannot be converted to the desired carbonyl compound. In addition, appreciable Grignard reagent is degraded, forming undesired by-product, thus requiring larger excesses of this reactant.

The use of elemental metals, such as magnesium, in place of the Grignard has been tried but, in such processes, it has been found necessary to employ iodine or iodine containing compounds to effect reaction (2,803,525). For large scale commercial use, requirement of such an additive has obvious economic disadvantages.

Accordingly, it is an object of this invention to provide a new and novel process for the preparation of group VI-B metal carbonyls. A specific object is to provide the carbonyls of VI-B elements of the periodic chart of the elements in higher yield than heretofore obtainable, using economical reactants.

It has now been found that the above and other objects of this invention are achieved and no iodine is necessary if a group I-A metal and carbon monoxide is added to the group VI-B metal salt at a temperature below reaction temperature, and the mixture, including the carbon monoxide, is thereafter heated to a temperature above about 80° C. with molybdenum and tungsten and, with chromium, above about 100° C. More specifically, the process comprises mixing a salt of a Group VI-B metal of the periodic chart of the elements with a metal of group I-A of the periodic chart of the elements and carbon monoxide, heating the mixture to a temperature above about 80° C. (100° with chromium salts) and thereafter hydrolyzing the product to form the metal carbonyl. While the benefits of this invention are generally applicable to the salts of all group VI-B metals, the process is particularly well suited to the manufacture of chromium hexacarbonyl which is extremely difficult to prepare by known techniques for the more common carbonyls, e.g., iron and nickel. Further particular advantage is achieved when the metal employed is sodium. Thus, one embodiment comprises the reaction of a salt of chromium, and especially the halides, e.g. chromic chloride, with sodium metal and carbon monoxide.

When employing the procedure of this invention, simultaneous reaction of the metal salt, the group I-A metal and the carbon monoxide is necessary, resulting in high yields, fast reaction rates and little or no by-product metal. Thus, compounds which previously have not been obtainable or were produced in low yields by the prior art techniques are now provided in high yields, without side reactions, suitable for commercialization. It will be noted that the stringent processing operations of the prior art techniques are not required and the difficulty of producing by-product metal is overcome. Another particular advantage of the present process is that many varied compounds of the transition metals can be employed. In contrast, with certain metals and employing the Grignard technique, only certain valence states of the metal can be utilized. For example, in the case of the chromium, molybdenum, and tungsten carbonyl preparation the trivalent, pentavalent, and hexavalent states respectively produce by far the best results. Other advantages of the process of this invention will be evident as the discussion proceeds.

The salts of the group VI-B metals employable are many and varied. For the purposes herein, the oxides and sulfides of these metals are also intended in the terminology "salts" although such are not truly salts. The group VI-B metals include the metals chromium, molybdenum and tungsten. The salts of such metals include both inorganic and organic salts. Typical examples of the inorganic salts are the halides, phosphates, sulfites, sulfates, nitrates, fluosilicates, carbonates, oxides, sulfides, and the like salts of such metals. The organic salts of these metals include, for example, the carboxylates, e.g., alkyl, aryl, cycloalkyl, and the like carboxylates, the alcoholates, e.g., phenates, alkoxides and enolates and the thioalcoholates or mercaptides. Among the inorganic salts employable in the process of this invention are chromous and chromic bromide, fluoride and chloride, carbonate, the various chromium oxides, chromium phosphate, chromium fluosilicate, chromium sulfate, chromium sulfide, chromium sulfite, and the like, including similar such compounds wherein chromium is replaced by the metals, molybdenum and tungsten. Among the organic salts of the group VI-B metals employable are included for example, chromous and chromic acetate, benzoate, citrate, formate, lactate, oxalate, malonate, valerate, naphthenate, oleate, acetylacetonate, toluate, phenate, ethylate, decanoate, thiomethylate, and the like salts of molybdenum and tungsten. It is to be understood that all valence states of the metals are intended. In general, in the organic type salts, the organo portion will contain between 1 to 25 carbon atoms, preferably 1-5, in each radical although higher such acid salts can be employed.

For best results, the inorganic salts of the group VI-B metals, particularly the halides, oxides and sulfides are especially preferred. Thus, the readily available ores of these metals are employable or materials such as the halides, which are easy to prepare therefrom, providing an economical process. In those instances wherein the metal salt is a solid in the reaction mixture, it is generally desirable to employ such materials in finely divided form of the order of about 1,000 microns or less in size.

Group I-A metals employed are lithium, sodium, potassium, rubidium, cesium, and francium, but, for economic and other reasons, lithium, potassium and particularly sodium are preferred.

These metals are employed in the process preferably in an active form, usually in a molten or dispersed form. The lithium, potassium, and especially sodium are frequently employed as dispersions in an inert hydrocarbon media, although other diluents can sometimes be employed such as ethers and amines.

In general, the process is readily performed by mixing at ambient temperature, at least below reaction temperature, e.g. below 100° C., the group VI-B metal salt, the group I-A metal and the carbon monoxide into a reaction vessel in a suitable inert atmosphere and, if desired, in the presence of an essentially inert liquid medium. The carbon monoxide is then pressurized into the reactor. The reaction mixture is agitated to provide adequate contact, and the reaction mixture is heated to a temperature above about 80° C. or with chromium above about 700° C. and not greater than about 250° C., preferably 125° C. to 175° C. At the completion of the reaction, the product is recovered by hydrolysis, followed by distillation, e.g., steam distillation, sublimation, or separation of by-products leaving the product in the liquid medium, when employed, which can then be recovered by concentration and filtration.

The hydrolysis can be conducted using water or an aqueous acid solution. Excellent results are obtained using dilute mineral acid solutions, such as 2-15 weight percent hydrochloric acid solutions. Likewise, steam can be employed to simultaneously hydrolyze and recover the product. The hydrolysis is best conducted under carbon monoxide pressure, such as by adding water directly to the reaction prior to venting the carbon monoxide reaction pressure. The intermediate product prior to hydrolysis is a group I-A salt of the corresponding metal carbonyls, e.g., Na₂Cr(CO)₅, K₂Cr(CO)₅, Li₂Cr(CO)₅

Na₂Mo(CO)₅, and the like. It is believed that the original hydrolysis product is the corresponding hydro metal carbonyl product which is unstable under reaction conditions and immediately disproportionate to the simple metal carbonyls.

The process of this invention will be more fully understood by reference to the following examples. In all examples, parts and yields are by weight.

*Example I*

To a reactor equipped with external heating and cooling means, internal agitation, means for maintaining pressure, and means for admitting and discharging reactants and products, was added at room temperature 4.7 parts of anyhdrous chromic chloride and 3.7 parts of sodium in the form of a 40 weight percent mineral oil dispersion (5.66 gram atoms sodium per gram mole of chromic chloride) and 100 parts of diethylene glycol dimethyl ether under an inert atmosphere of nitrogen. The reactor was then pressurized with 3000 p.s.i.g. of carbon monoxide and heated with continuous agitation to 125° C. These conditions were maintained for a period of 20 hours. At the end of this period, after cooling to room temperature, the gases in the reactor were vented to the atmosphere and the mixture was quenched with water and dilute hydrochloric acid. The mixture was then steam distilled and the distillate mixture filtered and dried in air. The conversion of chromic chloride to chromium hexacarbonyl was 15 percent. The actual yield, based upon chromic chloride utilization, was approximately quantitative.

*Example II*

Example I was repeated except that 8.2 parts of molybdenum pentachloride and 3.68 parts of metallic sodium (mole ratio sodium/metal salt of 5.3) was reacted with 3000 p.s.i.g. of carbon monoxide. The reaction was continued at 90° C. for 20 hours giving a conversion of the molybdenum pentachloride to molybdenum hexacarbonyl of 30 percent. As in Example I, the yield was essentially quantitative.

*Example III*

The procedure of Example I is repeated except that tungsten hexachloride is reacted with sodium dispersion and carbon monoxide (500 pounds) in tetrahydrofuran solvent. The reaction is carried out at 85° C. over a four-hour period. An excellent yield of tungsten hexacarbonyl is obtained upon hydrolysis with water. When anisole is employed instead of tetrahydrofuran, similar results are obtained.

*Example IV*

Example I is repeated except that chromic acetate is reacted with lithium metal as a dispersion in mineral oil. A carbon monoxide pressure of 3500 p.s.i.g. is employed. The reaction mass is heated and maintained at 165° C. for ten hours. The gram atoms of metal to metal salt is 10:1. An excellent yield of chromium hexacarbanyl is obtained upon hydrolysis of the reaction product with 5 percent hydrochloric acid and filtration of the reaction mixture.

*Example V*

The reactor and technique of Example I is repeated except that chromous chloride is reacted with carbon monoxide (1000 p.s.i.g.) in 2,4,4-trimethylpentane solvent (isooctane). The reaction mixture is heated and maintained at 150° C. for two hours. The potassium is employed as a dispersion, the total feed corresponding to a 3:1 mole ratio of potassium to the chromous chloride. The chromium carbonyl product is recovered by sublimation in excellent yield.

*Example VI*

Example I is repeated except that chromic acetylacetonate is reacted with carbon monoxide (3000 p.s.i.g.) in 2,6-dimethylpyridine solvent. A dispersion of sodium in mineral oil is added to the reactor. The chromium hexacarbonyl is recovered by steam distillation with excellent conversion of the chromium salt to the chromium hexacarbonyl.

*Example VII*

To a stirred reactor is added molybdenum sulfide (MoS₂), mesitylene solvent and a sodium dispersion in mineral oil corresponding to a total feed of five gram atoms of sodium per pole of molybdenum sulfide. The reactor is then pressurized with 1000 p.s.i.g. carbon monoxide pressure at room temperature and the reaction mixture is heated with agitation to a temperature of 165° C. over a period of 10 hours. The molybdenum carbonyl product is recovered by steam distillation in excellent yield.

Similar results are obtained when other group VI-B transition metal salts are employed in the above examples. For example, chromic bromide, chromic sulfide, tungsten acetylacetonate, chromium naphthenate, oleate, ethylate and the like can be substituted for the salts employed in the above examples.

The temperature at which the reaction is conducted is critical, i.e. temperatures between 80° to about 250° C. for molybdenum and tungsten and from about 100° to about 250° C. for chromium are employed. In general, the higher the temperature the faster the reaction rate. Accordingly, for such purposes it is preferred to operate at temperatures ranging from 125° C. to 175° C., depending upon the reactants employed. The pressure can be varied over a wide range from superatmospheric to subatmospheric pressures. Ordinarily, since the carbon monoxide is a gas, pressures above atmospheric are employed. A preferred range is between 500 to 3000 p.s.i. in order to obtain optimum results. Pressures from about atmospheric up to about 10,000 can be employed with good results.

The time of reaction will likewise depend somewhat upon the other conditions under which the reaction is conducted although times between about 1 minute to 20 hours are generally quite adequate. In order to minimize side effects it is preferred to conduct the reaction for a period of from 5 minutes to 6 hours.

The proportions of the reactants can likewise be varied and generally are based upon the metal salt. In this connection between about 1 gram atom to about 20 gram atoms, preferably 3 to 6, are employed per gram mole of the metal salt. Where excesses of the group I-A metal are employed, such excesses may be recovered and reused. The carbon monoxide is generally employed in above stoichiometric amounts, although these excesses can be efficiently recovered.

While the above examples indicate that an organic diluent is employed, it is to be understood that such are not essential. In general, when such are employed they should be essentially inert to the reactants. Furthermore, it is desirable, but not necessary, that they exhibit solubility for one or more of the reactants. Among such organic diluents which can be employed are included the hydrocarbons, ethers and amines. Among the hydrocarbons included are, for example, heptanes, nonanes, octadecanes, hexanes, toluene, benzene, xylene, mesitylene, naphthalenes, anthracenes and mixed hydrocarbons such as gasoline, diesel oil and the like petroleum fractions. Among the ethers employable are included for example the non-aromatics, aromatics and polyethers including, for example, di-sec-butyl ether, di-n-heptyl ether, di-isopropyl ether, ethylisoamyl ether, methylphenyl ether (anisole), p-tolyl ether, ethylphenyl ether, tetraethylene glycol dimethyl ether, and the dimethyl, diethyl, and di-n-butyl ethers of diethylene glycol. Also, cyclic ethers such as tetrahydrofuran, tetrahydropyran and dioxane. Among the amines which are employable are included trimethyl amine, triethyl amine, tributyl amine, trioctyl amine, triphenyl amine, tricyclohexyl amine, methyldiethyl amine, p-methyl pyridine, o-methyl pyridine, 2,6-dimethylpyridine, isoquinoline, and the like.

The coordinating solvents, especially the ethers, are particularly preferred since these materials exhibit a reaction promoting effect.

The process provides products which are of considerable use. These products can be, for example, subjected to high temperatures, thereby providing decomposition to obtain the respective metals in finely divided form. For example when molybdenum carbonyl is heated at a temperature above 250° C. in an inert atmosphere a finely divided pyrophoric product is obtained which is useful in electronic tubes for anodes and support members or an alloying in making steels. The carbonyls of the metals chromium, molybdenum and tungsten and mixtures thereof or with other metal carbonyls, in various atmospheres, can be decomposed on metal surfaces, such as steel to give resistant coatings, e.g., stable at high temperatures. These valuable metals can also be produced in extremely pure form and are sufficiently ductile for structural purposes as in aircraft fabrication. Another particular use for the compounds produced according to the process of this invention is as additives to fuels, particularly those used for internal combustion engines and the like. For example, when sufficient chromium hexacarbonyl is added to commercial gasoline to obtain compositions containing 1 gram of chromium per gallon, the octane number of the gasoline is increased. The products are also useful as chemical intermediates in preparing organometallic compounds. These and other uses will be evident to those skilled in the art.

Having thus described the process of this invention, it is not intended that it be limited except as set forth in the following claim.

We claim:

The process of manufacture of the hexacorbonyls of a group VI–B metal which comprises forming an iodine-free mixture of (1) an alkali metal dispersed in an inert, anhydrous diluent, (2) carbon monoxide, and (3) a salt of a group VI–B metal with an anion selected from the group consisting of chloride, acetate, acetylacetonate and sulfide; heating said mixture to a temperature sufficient to effect reaction to form the hexacarbonyl, said temperature being sufficient to cause the reaction to take place and between about 80 and about 250° C.; and then hydrolyzing the reaction mixture.

References Cited in the file of this patent

UNITED STATES PATENTS 2,803,525   Brimm _____ Aug. 20, 1957

FOREIGN PATENTS 678,712   Great Britain _____ Sept. 10, 1952